UNITED STATES PATENT OFFICE 2,674,597

BASICALLY SUBSTITUTED N-CYCLOALKYL-CINNAMAMIDES AND METHODS FOR THEIR PREPARATION

John W. Cusic, Skokie, Ill., assignor to G. D. Searle & Co., Chicago, Ill., a corporation of Illinois No Drawing. Application April 1, 1953,
Serial No. 346,280

7 Claims. (Cl. 260—240)

The present invention relates to a new group of organic compounds and more particularly to the basically substituted N-cycloalkylcinnamamide derivatives of the structural formula

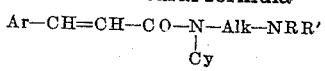

wherein Ar represents an aryl hydrocarbon radical, Cy is a lower cycloalkyl radical, Alk is a lower alkylene radical and NRR' is either a lower dialkylamino radical or a saturated nitrogen-containing heteromonocyclic radical attached to the Alk radical through a nitrogen in the heteromonocycle.

In the foregoing structural formula Ar represents an aryl hydrocarbon radical containing preferably six to ten carbon atoms which can be a phenyl radical or a lower alkylated phenyl radical, such as tolyl, xylyl, ethylphenyl, propylphenyl and butylphenyl. The radical Cy represents a lower cycloalkyl radical such as cyclopentyl, cyclohexyl, methylcyclopentyl, dimethylcyclopentyl, ethylcyclohexyl and the like. The bivalent radical Alk is a lower alkylene radical such as ethylene, propylene, butylene, hexylene or a polymethylene radical such as trimethylene, tetramethylene, pentamethylene and hexamethylene, separating the two nitrogen atoms attached thereto by at least two carbon atoms. The radicals R and R' represent such lower alkyl groups as methyl, ethyl, straight and branched chain propyl, butyl, amyl and hexyl. In addition the radical NRR' can also be a saturated nitrogen-containing heteromonocyclic group attached to the radical Alk through a nitrogen in the heteromonocycle such as the pyrrolidino, piperidino, lupetidino, piperazino, and thiamorpholino radical; of special interest for the purpose of this invention is the morpholino radical.

The organic bases of the foregoing type form salts which are non-toxic in therapeutic dosage with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds of this invention have valuable therapeutic properties. The N-cycloalkyl compounds claimed herein have been found to exert a potent effect on the glomeruli, greatly increasing excretion of water and of sodium. This activity is lacking where the Cy radical of the foregoing structural formula is replaced by an aryl or aralkyl radical as shown in the compounds of the last three examples which find utility as local anesthetics.

The examples below illustrate in detail some of the compounds which constitute this invention and methods for their production. However, this invention is not to be construed as limited thereby in spirit or in scope. In these examples temperatures are given in degrees centigrade (°C.), relative amounts of materials in parts by weight and pressures during vacuum distillations in millimeters (mm.) of mercury.

EXAMPLE 1

*N-(β-diethylaminoethyl)-N-cyclohexylcinnamamide*

A mixture of 166 parts of cinnamoyl chloride and 198 parts of N-(β-diethylaminoethyl)cyclohexylamine in 1700 parts of benzene is heated at reflux temperature for 2 hours, cooled and extracted with dilute hydrochloric acid. The extract is rendered alkaline by addition of potassium hydroxide and extracted with ether. This extract is dried over anhydrous potassium carbonate, filtered and evaporated to yield the N-(β-diethylaminoethyl)-N-cyclohexylcinnamamide which is distilled at about 216–218° C. and 1 mm. pressure. Treatment of an ether solution of the base with a 25% solution of hydrogen chloride in isopropanol under anhydrous conditions yields an oily hydrochloride which solidifies on standing for a short time. Recrystallized from a mixture of isopropanol and ethyl acetate, this salt melts at about 176–177° C. It has the structural formula

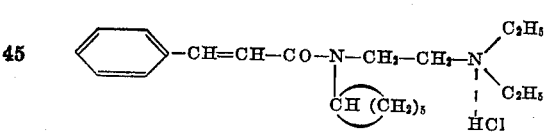

EXAMPLE 2

*N - (δ - dimethylaminobutyl) - N - (3 - methylcyclopentyl) cinnamamide*

To a mixture of 196 parts of 3-methylcyclopentanone and 232 parts of N,N-dimethylputrescine, 94 parts of 98% formic acid are added gradually. The initial reaction is controlled by efficient refrigeration. The mixture is then heated at refluxing temperature for 6 hours with agitation and permitted to stand at room temperature for several hours. After cooling 220 parts of concentrated hydrochloric acid are added and refluxing is resumed for 7 hours. 300 parts of water are added and the mixture is washed with benzene, made alkaline with potassium carbonate and extracted with benzene. The benzene extract is washed with water, dried with anhydrous sodium sulfate and evaporated in vacuo. 200 parts of the resulting N,N - dimethyl - N' - (3 - methylcyclopentyl) - putrescine are heated with 168 parts of cinnamoyl chloride in 1700 parts of toluene at reflux temperature for two hours and then treated with ice and dilute hydrochloric acid. The aqueous layer is separated, washed with ether, rendered alkaline by addition of potassium hydroxide and extracted with ether. This extract is dried over anhydrous calcium sulfate, filtered and evaporated to yield the N-(δ-dimethylaminobutyl) - N - (3 - methylcyclopentyl) - cinnamamide which is distilled at about 211–219° C. and 0.9 mm. pressure. It has the structural formula

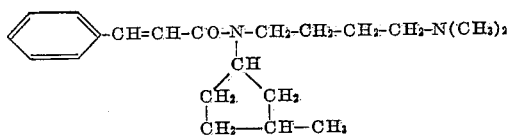

EXAMPLE 3

*N - (β - diisopropylaminoethyl) - N - cyclopentylcinnamamide*

A solution of 84 parts of cyclopentanone in 120 parts of ethanol is treated with 144 parts of N,N-diisopropylethylenediamine and 35 parts of Raney nickel. This mixture is hydrogenated in a Parr medium pressure bomb for six hours at 110° C. and 650 pounds pressure. After cooling the contents of the bomb are filtered and the filtrate is evaporated. Upon vacuum distillation at 3 mm. pressure the N-(β-diisopropylaminoethyl) - cyclopentylamine is collected at about 118–124° C.

A mixture of 100 parts of the distillate and 80 parts of cinnamoyl chloride in 800 parts of benzene is heated at reflux temperature for 90 minutes, cooled and extracted with dilute hydrochloric acid. This extract is rendered alkaline by addition of sodium hydroxide and extracted with ether. The ether extract is dried over anhydrous calcium sulfate, filtered and evaporated to yield the N-(β-diisopropylaminoethyl)-N-cyclopentylcinnamamide which is distilled at about 220–230° C. and 1.2 mm. pressure. It has the structural formula

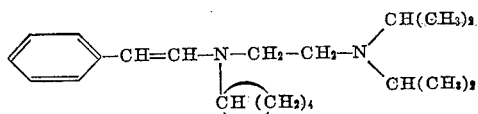

EXAMPLE 4

*N - (β - dimethylaminoethyl) - N - cyclohexyl-p-isopropylcinnamamide*

To a solution of 196.3 parts of cyclohexanone in 200 parts of ethanol are added 176.3 parts of N,N-dimethyl-ethylenediamine in 50 parts of Raney nickel. This mixture is hydrogenated in a Parr medium pressure bomb for 3.5 hours at 135° C. and 550 pounds pressure. After cooling the contents of the bomb are filtered and concentrated in vacuo. The N-(β-dimethylaminoethyl) cyclohexylamine is obtained on vacuum distillation at about 90–93° C. and 7 mm. pressure.

A mixture of 170 parts of the distillate and 208 parts of p-isopropylcinnamoyl chloride in 2000 parts of toluene is heated at reflux temperature for three hours, cooled and extracted with dilute hydrochloric acid. The extract is washed with ether, rendered alkaline by addition of sodium hydroxide and extracted with ether. This extract is dried over anhydrous calcium sulfate, filtered and evaporated to yield the N-(β-dimethylaminoethyl) - N - cyclohexyl - p - isopropylcinnamamide which is distilled at about 220–228° C. and 1 mm. pressure. It has the structural formula

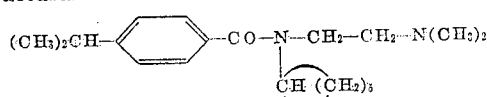

EXAMPLE 5

*N - (β - morpholinoethyl) - N - cyclopentyl-m,p-dimethylcinnamamide*

A solution of 193 parts of cyclopentanone in 200 parts of ethanol is treated with 260 parts of β-aminoethylmorpholine and 60 parts of Raney nickel in alcoholic suspension. This mixture is hydrogenated in a Parr bomb at 600–700 pounds pressure and 100–120° C. for five hours. After cooling to room temperature the contents of the bomb are filtered and the filtrate is evaporated. The residue is distilled at 7 mm. pressure, the N-(β-morpholinoethyl)-cyclopentylamine distilling at about 142–143° C.

A mixture of 102 parts of the distillate and 100 parts of m,p-dimethylcinnamoyl chloride in 900 parts of benzene is heated at reflux temperature for 3 hours and then treated with ice and dilute hydrochloric acid. The aqueous layer is separated, washed with ether, rendered alkaline by addition of potassium hydroxide and extracted with ether. This ether extract is dried over anhydrous calcium sulfate, stirred with charcoal and filtered to yield the N-(β-morpholinoethyl) - N - cyclopentyl - m,p - dimethylcinnamamide as a light yellow, viscous, high boiling oil. The compound has the structural formula

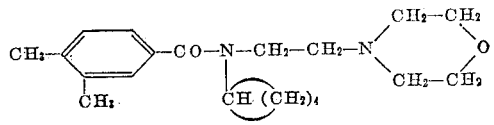

EXAMPLE 6

*N-(β-diethylaminoethyl) cinnamanilide*

A mixture of 166 parts of cinnamoyl chloride and 192 parts of N-(β-diethylaminoethyl) aniline in 1700 parts of benzene is heated at reflux temperature for two hours, cooled and extracted with dilute hydrochloric acid. The extract is rendered alkaline by addition of sodium hydroxide and extracted with ether. This extract is dried over anhydrous calcium sulfate, filtered and evaporated to yield the N-(β-diethylaminoethyl) cinnamanilide which is distilled at about 205–207° C. and 2 mm. pressure.

Treatment of an ether solution of this base with anhydrous alcoholic hydrogen chloride yields the hydrochloride which, recrystallized from a mixture of isopropanol and ethyl acetate, melts at about 154–155° C.

EXAMPLE 7

*N-(β-diethylaminoethyl)-N-benzylcinnamamide*

A mixture of 166 parts of cinnamoyl chloride and 206 parts of N-(β-diethylaminoethyl) benzylamine in 1700 parts of benzene is heated at reflux temperature for two hours, cooled and extracted with dilute hydrochloric acid. The extract is rendered alkaline by addition of ammonium hydroxide and then extracted with ether. This ether extract is dried over anhydrous potassium carbonate, filtered and evaporated to yield the N-(β-diethylaminoethyl)-N-benzylcinnamamide which is distilled at about 220–222° C. and 1 mm. pressure.

Treatment of an ether solution of this base with alcoholic hydrogen chloride yields the hydrochloride which, recrystallized from a mixture of isopropanol and ethyl acetate, melts at about 158–159° C.

EXAMPLE 8

*N-(β-diethylaminoethyl)-N-(α-phenethyl)-cinnamamide*

240 parts of acetophenone in 220 parts of ethanol are treated with 232 parts of N,N-diethylethylenediamine and 150 parts of Raney nickel with slight warming. The mixture is then introduced into a Parr bomb and hydrogenated therein at about 130° C. under 500–600 pounds pressure for six hours. After cooling the contents are filtered and the solvent is removed from the filtrate by distillation. The N-(β-diethylaminoethyl)-α-phenethylamine is distilled at about 128–130° C. at 8 mm. pressure.

A mixture of 220 parts of the distillate and 180 parts of cinnamoyl chloride in 1700 parts of anhydrous toluene is heated at reflux temperature for an hour, cooled and extracted with ether. This extract is dried over anhydrous potassium carbonate, filtered and evaporated to yield the N-(β-diethylaminoethyl)-N-(α-phenethyl)cinnamamide which is distilled at about 217–218° C. and 2 mm. pressure.

I claim:

1. A compound of the structural formula

Ar—CH=CH—CO—N—Alk—NRR'
              |
              Cy wherein Ar is an aryl hydrocarbon radical containing six to ten carbon atoms, Cy is a lower cycloalkyl radical containing more than 4 and less than 7 nuclear carbon atoms, Alk is a lower alkylene radical separating the two nitrogen atoms attached thereto by at least two carbon atoms and NRR' is a member of the class consisting of lower dialkylamino and morpholino radicals.

2. A compound of the structural formula

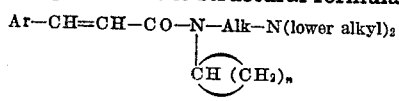

wherein Ar is an aryl hydrocarbon radical containing six to ten carbon atoms, Alk is a lower alkylene radical separating the two nitrogen atoms attached thereto by at least two carbon atoms and $n$ is an integer greater than three and smaller than six.

3. A compound of the structural formula

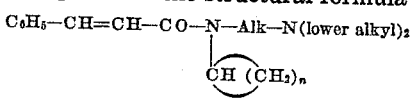

wherein Alk is a lower alkylene radical separating the two nitrogen atoms attached thereto by at least two carbon atoms and $n$ is an integer greater than three and smaller than six.

4. A compound of the structural formula

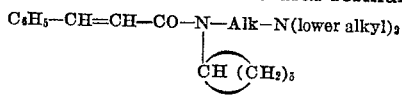

wherein Alk is a lower alkylene radical separating the two nitrogen atoms attached thereto by at least two carbon atoms.

5. N-(β-diethylaminoethyl)-N-cyclohexylcinnamamide.

6. A compound of the structural formula

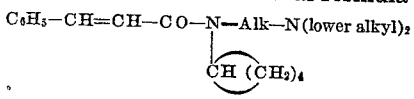

wherein Alk is a lower alkylene radical separating the two nitrogen atoms attached thereto by at least two carbon atoms.

7. A compound of the structural formula

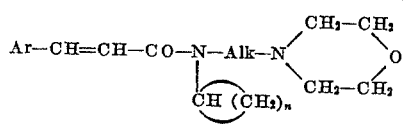

wherein Ar is an aryl hydrocarbon radical containing six to ten carbon atoms, Alk is a lower alkylene radical separating the two nitrogen atoms attached thereto by at least two carbon atoms and $n$ is an integer greater than three and smaller than six.

References Cited in the file of this patent

UNITED STATES PATENTS

| Number | Name | Date |
|---|---|---|
| 2,139,687 | Lott | Dec. 13, 1938 |
| 2,310,973 | Lott | Feb. 16, 1943 |